Oct. 3, 1967
R. A. BERGAN
3,344,872
APPARATUS FOR INDICATING THE LENGTH
OF CORE IN A CORE BARREL
Filed Oct. 22, 1965
2 Sheets-Sheet 2
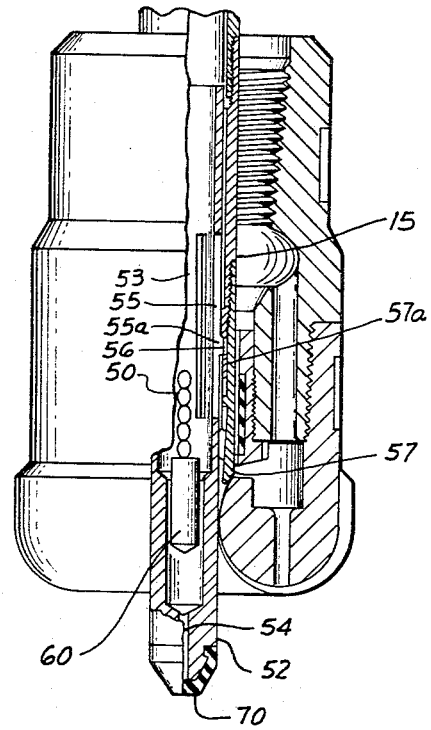
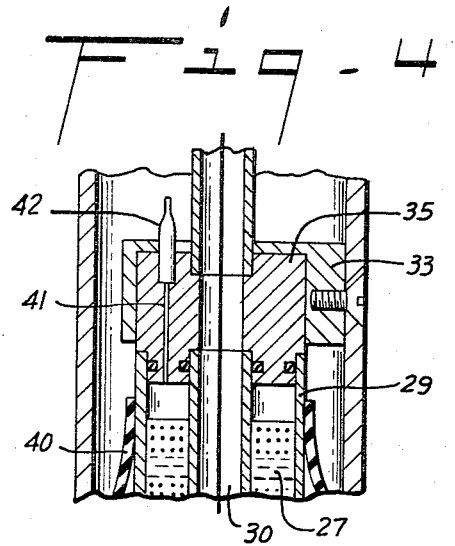
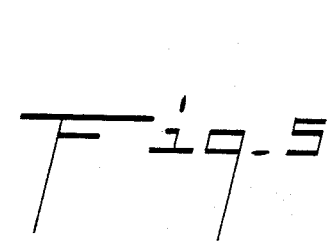
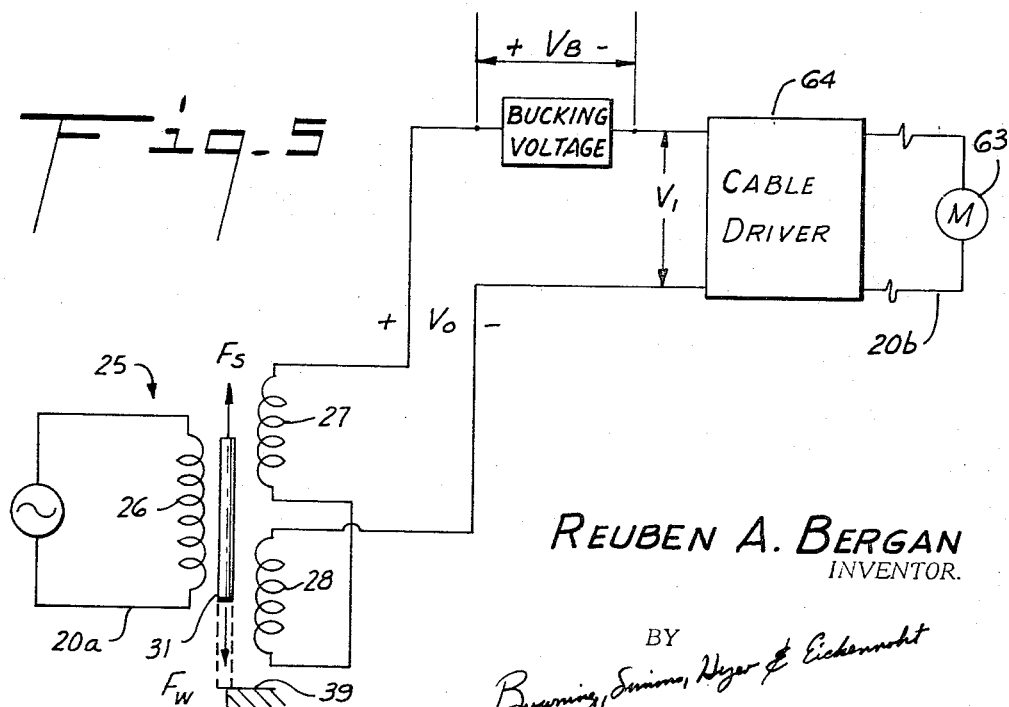
REUBEN A. BERGAN
INVENTOR.
BY
ATTORNEYS 3,344,872
APPARATUS FOR INDICATING THE LENGTH OF CORE IN A CORE BARREL
Reuben A. Bergan, Houston, Tex., assignor, by mesne assignments, to the United States of America as represented by the National Science Foundation
Filed Oct. 22, 1965, Ser. No. 501,502
9 Claims. (Cl. 175—46)

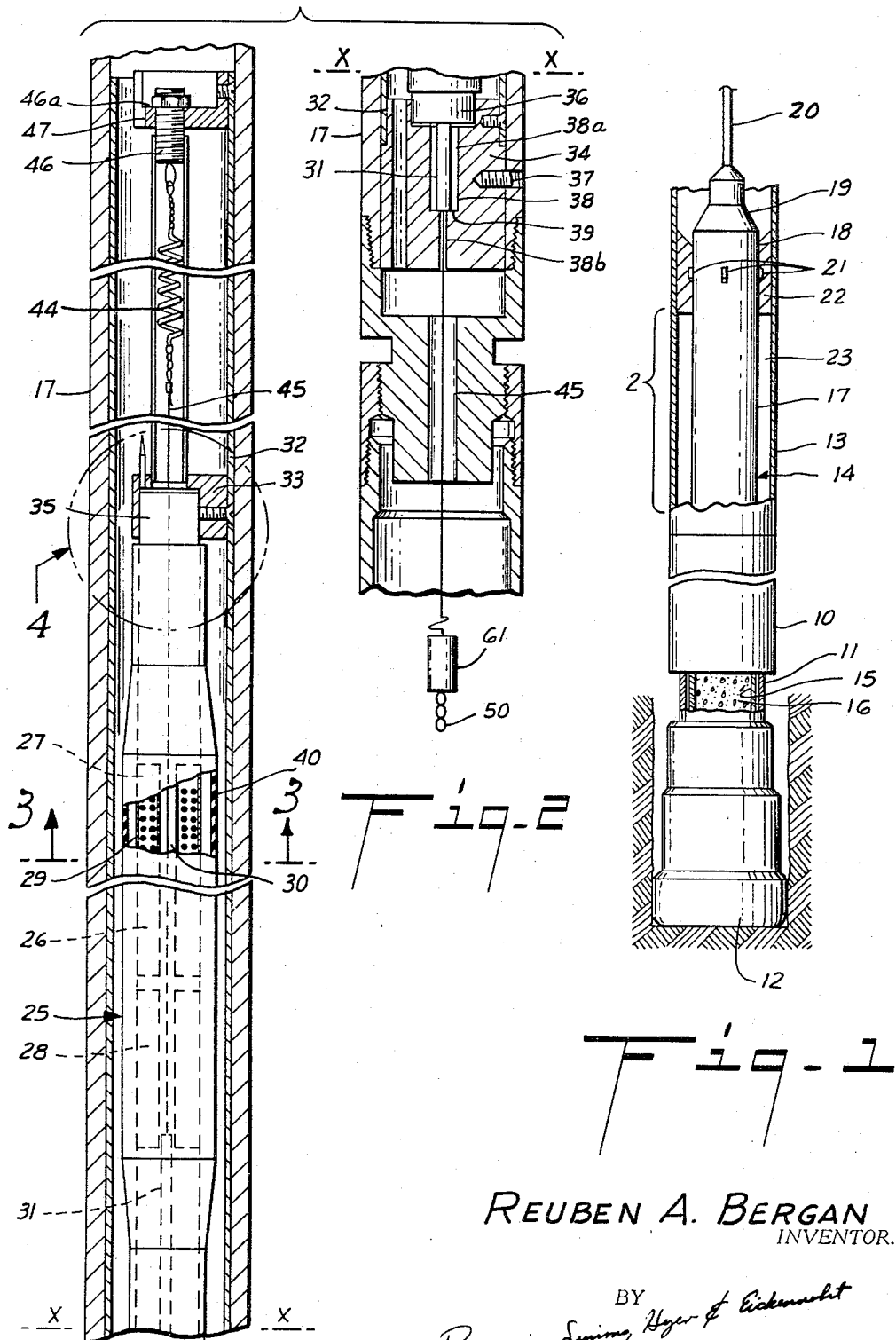

This invention relates to apparatus for indicating at the surface the length of core in a core barrel as the core is being cut from a subterranean formation.

Core barrels usually have what is called an inner barrel into which the formation core is received as it is cut. The inner barrel is designed to receive a core of a certain length. Heretofore, the length of the core in the inner barrel, at a given time during coring operations, was determined indirectly, usually, by measuring the distance the pipe string had been lowered into the ground since coring began. This system was subject to considerable error for its accuracy depended on the sensitivity of the weight indicator, the ability of the driller to interpret the weight indicator reading, and the accuracy of the pipe tally. Using this system, if an error is made and coring continues after the inner barrel is full, damage to the core and/or the core barrel may result. Conversely, if the barrel is pulled before the inner barrel is full, the hole drilled per trip is reduced, which increases the cost of the well.

Therefore, it is an object of this invention to provide apparatus that will provide a more accurate surface indication of the length of core in a core barrel.

It is another object of this invention to provide apparatus for indicating at the surface when the core enters the inner barrel and when the inner barrel is full of core.

It is another object of this invention to provide apparatus that will indicate continuously at the surface the length of the core in the inner barrel while the core is being cut.

These and other objects, advantages and features of the invention will be apparent to those skilled in the art from a consideration of this specification and attached drawings.

These objects are obtained in accordance with this invention by locating a transducer adjacent the inner barrel of the core barrel that has an output signal proportional to the force exerted thereon. A force is then exerted on the transducer that is proportional to the length of core in the inner barrel so that its output signal is also proportional to the length of core in the barrel. This output signal then is transmitted to the surface where it is measured to indicate the length of core in the barrel.

In the preferred embodiment, the transducer is an adjustable electrical element and weighted means are located in the inner barrel to exert a force to adjust the element in one direction. As the core enters the inner barrel, the force exerted by the weight means is reduced changing the adjustment of the transducer, thereby changing the output signal thereof in proportion to the distance the core enters the inner barrel. The output signal then is sent to the surface where it is measured to indicate the length of the core in the inner barrel.

Also, in the preferred embodiment, the weight means are arranged to produce relatively large changes in the output signal of the adjustable element, when the core first enters the inner barrel, and when the core approaches the upper end thereof. In this way, the observer at the surface can get a clear indication of when coring has begun and when the core barrel should be pulled.

The preferred embodiment of the invention will now be described in connection with the attached drawings in which:

FIGURE 1 is a view partially in elevation and partially in section of a core barrel equipped with the apparatus of this invention in the process of cutting a core;

FIGURE 2 is a vertical sectional view on an enlarged scale of the portion of the apparatus of the invention that is located in the core barrel above the inner barrel and located generally within the bracket 2 shown in FIGURE 1;

FIGURE 3 is a cross sectional view of the bit and the lower end of the core barrel;

FIGURE 4 is a view on an enlarged scale of the portion of the apparatus encircled in FIGURE 2; and FIGURE 5 is a simplified diagram of the electrical circuit employed in the preferred embodiment of the invention.

FIGURE 1 shows a fluid turbine powered core barrel cutting a core of a subterranean formation. These tools are called "turbocorers." They include a fluid turbine section 10 that has a hollow output shaft 11 to which is attached core bit 12. Connected to the top of the turbine section and extending upwardly to be connected to the drill pipe (not shown) is outer housing 13. This outer housing plus the housing of the turbine is generally referred to as the outer barrel of the turbocorer.

Retrievably mounted on the inside of the outer barrel and extending downwardly through the hollow shaft of the turbine to a point adjacent the end of the bit 12 is inner barrel assembly 14. This assembly includes an inner core barrel 15 into which core 16 is received, upper instrument section 17, latch 18, and swivel connection 19, which connects the inner barrel assembly to wire line 20. Latch 18 is usually is mechanically operated. It employs dogs 21 that engage a groove in latch spider 22 mounted in outer barrel 13. The latch holds the inner barrel assembly from moving upward and rotating relative to the outer barrel.

To power the turbine and to cool and clean the bit, drilling fluid is circulated down the drill pipe through annular space 23 between the inner barrel and the outer barrel. The latch spider has longitudinal passageways (not shown) that allow the passage of the drilling fluid.

With this type of apparatus, the turbine rotates the bit through its output shaft and rotation of the drill pipe is not required to rotate the bit. Usually the pipe is rotated very slowly, however, during coring operation.

To indicate the distance core 16 has entered inner barrel 15 in accordance with this invention, means are provided to vary the force on a transducer in proportion to said distance. The output signal of the transducer varies in proportion to the length of core in the barrel. In the embodiment shown in the drawing, the transducer is an adjustable element, linear variable differential transformer (LVDT) 25. The transformer is connected in an electrical circuit that includes indicating means 63 (FIGURE 5) that are located at the surface. The indicating means are responsive to the parameter that is changed in the circuit by the adjustable element.

Transformer 25 includes primary coil 26 that is located between and in axial alignment with two secondary coils 27 and 28 (FIGURE 2). The coils are mounted in annular housing 29. The housing has a central opening 30, through which core 31 can be moved axially to change the output of the secondary coils.

The transformer is mounted in transformer housing 32 by upper bracket 33 and lower bracket 34. Both brackets are connected to transformer housing 32 by machine screws as shown. The lower bracket also is connected to instrument housing 17 by screws 37 to support the transformer therein.

Both brackets are provided with sockets to receive end plugs 35 and 36, respectively, which close the end of annular coil housing 29. Both end plugs 35 and 36 have axial openings in alignment with the opening through coil housing 29 to allow the core of the transformer to be connected to means for moving it in one direction or the other. This is also true of the brackets. Opening 38 in the lower bracket has an upper section 38a, which is large enough to receive the transformer core. Lower section 38b, however, is not large enough to receive the core to provide a shoulder 39 to stop the downward travel of the core out of the transformer.

To keep the hydrostatic pressure from collapsing coil housing 29, means are provided to equalize the pressure on the inside and outside of the housing as the tool is lowered in the hole. As best seen in FIGURES 2 and 4, the housing is enclosed by flexible sleeve 40, preferably made of an elastic material such as rubber. Its ends are sealed to the coil housing and the outer wall of the coil housing is perforated along its length to provide communication between the inside of the coil housing and the inside of the sleeve. Then the air inside the housing is removed through opening 41 in end plug 35 and tube 42. After the air has been evacuated, the housing is filled with a non-conductive liquid such as a transformer oil and sufficient pressure is applied thereto to cause the sleeve to balloon out somewhat in the manner shown in the drawings. Then tube 42 is pinched closed to seal the oil in. With this arrangement, as the pressure builds up on the outside of the transformer it will be transmitted to the fluid both on the inside and outside of the coil housing through the flexible sleeve and no collapse or burst stresses will be placed on the housing.

Resilient means are provided to urge the transformer core upwardly with respect to the coils. In the embodiment shown, coil spring 44 has one end connected to the core through line 45 and one end connected to bolt 46. The bolt is held against downward movement by nut 46a and bracket 47. The bracket is connected to the transformer housing as shown in FIGURE 2.

Means are provided to exert a force on the core that is proportional to the distance the core has entered the inner barrel of the core barrel. In the embodiment shown, a weight member comprising link chain 50 is connected to the lower end of the transformer core and suspended in the inner barrel of the core barrel. The chain extends to a point adjacent the lower end of the inner barrel to be picked up by the formation core as it enters the inner barrel. Thus the length of chain hanging on core 31 of the transformer is reduced in proportion to the distance the formation core enters the inner barrel. Preferably, the chain is of substantially uniform weight per unit of length so that the change in downward force on the transformer core will be linear with respect to the length of formation core in the barrel. The total weight of the chain should be such that it extends spring 44 and holds the transformer core against shoulder 39 or at least adjacent the lower end of the transformer. Then as the formation core picks up the weight of incremental parts of the chain as it enters the barrel, spring 44 will be able to move the transformer core upwardly with respect to the coils a distance proportional to the length of chain supported by the formation core.

The upward movement of the transformer core also will cause upward movement of the chain. This will cause an error in the output signal. This can be predetermined and accounted for. Usually, however, in most cases, the length of the chain versus the travel of the core will be such that it can be ignored.

Various items and devices can be used for the weight member other than link chain 50. For example, a thin, light, flexible, line having very little weight could be arranged with weights spaced equidistantly therealong to provide a surface indication as each weight is picked up by the core. This type of chain may be particularly useful where the inner barrel is long and the volume of the collected chain should be kept to a minimum. A flexible line also could be used. A line, in fact, would give better resolution.

Means are provided to collect the chain as the core moves upwardly in the inner barrel. It is preferred to have some container or vessel in which the chain can be collected, rather than let it rest on top of the core and possibly fall down between the core and the inner barrel and jam the core in the barrel.

As shown in FIGURE 3, plug 52 is positioned in the lower end of the inner barrel. The plug has a central opening 54 therethrough. The upper section of the opening is of large diameter to form chamber 53 in which chain 50 is collected as the plug is moved upward in the inner barrel by the core. The lower section of the opening is of reduced diameter to keep the chain from falling through. The lower end of the plug is covered by cap 70 of rubber which acts as a cushion for the end of the plug and which also keeps debris from entering opening 54.

The walls of the plug, intermediate the ends of chamber 53, are slotted longitudinally to form a plurality of flexible ribs 55. Each rib is provided with an outwardly protruding dog 55a which engages annular groove 56 between the lower end of inner barrel 15 and ring 57a of core catcher 57. With the dogs in the slot, the plug is held in position in the lower end of the inner barrel 15 until sufficient upward force is exerted on the plug to cause the ribs to flex inwardly far enough for the dogs to move out of engagement with the slot. Preferably, the force required to do this is such that the plug will remain in the end of the inner barrel until the plug engages the subterranean formation and the drilling weight is applied to the bit.

Normally, before the inner barrel is removed from the hole to recover the core, the outer barrel and core bit are raised off the bottom of the hole. Then, after the inner barrel is reinserted into the outer barrel, the bit will be lowered back to the bottom of the hole to resume coring operations. The driller judges when he is on bottom by his weight indicator, but oftentimes, it is difficult for him to tell when he does engage bottom. Therefore, in accordance with another feature of this invention, weight 60 is connected to the end of chain 50 and located adjacent the lower end of chamber 53 in the plug. This weight is sufficient to cause a substantial change in the output signal of the transformer, when its weight is removed from the chain. Then when the bit is lowered into engagement with the bottom of the hole, the plug will be unseated and moved upwardly far enough to pick up weight 60, changing the output signal and indicating to the driller that he is on the bottom of the hole.

As coring continues, plug 52 will be carried upwardly in the inner barrel by the formation core and collect the chain in chamber 53 as it does so. If desired, as additional weight 61 can be positioned adjacent the upper end of the inner barrel to cause another large change in the meter reading at the surface to indicate that the core barrel is full of core. In between times, of course, the change in the weight of the chain on the transformer core will cause an indication at the surface of the length of core in the core barrel.

In FIGURES 1–4, no electrical conductors were shown for sake of simplicity, however, a simplified diagram of the electrical circuitry of the apparatus is shown in FIGURE 5. $F_s$ is the force exerted by the spring and $F_w$ is the force exerted by the weight member; the chain in this case. Power is supplied to primary coil 26 through conductor 20a of multi-conductor cable 20. The output signal from the secondary coils is transmitted to the surface through conductor 20b contained in the same cable. Transformer 25, as shown in FIGURE 5, is arranged with the secondary coils connected in series opposition so that output voltage $V_o$ is the difference in the voltage induced in the secondary coils. $V_o$, of course, will depend upon the position of the core relative to the secondary coils. Ordinarily the null position, i.e., the position of zero output voltage, occurs when the core is equally distributed between the secondary coils, as shown in FIGURE 5. So that a positive reading will be indicated on meter 63 at all times, bucking voltage $V_B$ is provided to shift the null position to when the core is at its maximum downward travel. Thus, the meter will read zero when no formation core is in the inner barrel and all of the weight of the chain is being supported by the transformer core.

Cable driver 64 conditions the output voltage for transmittal to the surface where it is read on meter 63. The meter, of course, can be calibrated to indicate directly the length of core in the barrel. Where weight 60 is employed to indicate when the bit is on the bottom, the meter can be arranged to go on scale at the point this weight is removed from the chain and then it can be arranged to go off scale, when the downward force of second weight 61 is removed from the core of the transformer.

From the foregoing, it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. Apparatus for indicating at the surface the length of core in the inner barrel of a core barrel as a core is being cut from a subterranean formation, comprising, transducer means located adjacent the inner barrel for producing an output signal proportional to the force imposed thereon, means for exerting a variable force on the transducer means whose magnitude is proportional to the length of core in the inner barrel, and means at the surface for measuring the output signal of the transducer means to indicate the length of core in the barrel.

2. Apparatus for indicating at the surface the length of core in the inner barrel of a core barrel as a core is being cut from a subterranean formation comprising electrical circuit means extending from the surface to the core barrel including indicating means at the surface responsive to a changing parameter in the circuit and an adjustable element at the core barrel for changing said parameter, said adjustable element having a stationary section and a section movable relative to the stationary section to change the output signal of said adjustable means; resilient means urging the movable section in one direction, an elongated flexible member connected to the movable section and suspended in the inner barrel for the weight of the member to exert a force on the movable section opposing the force exerted thereon by the resilient means, and means to decrease the force exerted on the movable section by the member as a core enters the inner barrel to allow the resilient means to change the position of the movable section of the element and thereby change the output signal thereof in proportion to the length of core in the inner barrel.

3. Apparatus for indicating the length of core in the inner barrel of a core barrel, comprising, a transformer mounted in the core barrel above the inner barrel, said transformer having a winding section with primary and secondary windings and a core section, means mounting one of said transformer sections for movement relative to the other section to change the output of the secondary winding in proportion to the relative movement of the two sections, resilient means urging the movable section in one direction and an elongated flexible weight member located in the inner barrel suspended from the movable section for its weight to exert a force on the movable section urging it in the opposite direction from the resilient means, and means to decrease the force exerted on the movable section by the weight member as the core enters the inner barrel to allow the resilient means to change the position of the movable section of the transformer to thereby change the output signal thereof in proportion to the length of core in the barrel.

4. The combination of claim 3 wherein the weight member is a chain of uniform weight per unit of length.

5. The combination of claim 3 in which an additional weight is attached to the weight member adjacent the end of the inner barrel to cause a large change in the output signal of the transformer when the core is near said end of the barrel.

6. Apparatus for indicating at the surface the length of core in the inner barrel of a core barrel as a core is being cut from a subterranean formation comprising electrical circuit means extending from the surface to the core barrel including indicating means at the surface responsive to a changing parameter in the circuit and an adjustable element at the core barrel for changing said parameter, said adjustable element having a stationary section and a section movable relative to the stationary section to change the output signal of said adjustable means; resilient means urging the movable section in one direction, an elongated, flexible member connected to the movable section and suspended in the inner barrel to exert a force on the movable section opposing the force exerted thereon by the resilient means, and means slidably mounted in the inner barrel to be moved upwardly in the barrel by the core as it enters therein to incrementally collect the flexible member and reduce the force exerted on the movable section by an amount proportional to the distance the core has entered the barrel to permit the resilient means to move the movable section of the adjustable element and change the output signal thereof an amount proportional to the length of core in the barrel.

7. The combination of claim 6 in which the flexible member is a flexible line having a plurality of weights attached to and spaced along the line.

8. The combination of claim 6 in which the flexible member is provided with a weight at its lower end and said collecting means is provided with a downwardly extending plug member to engage the subterranean formation to be cored and move the collecting means upwardly to support the weight and cause a relatively large change in the output signal when the inner barrel is in position to receive a core.

9. The combination of claim 6 in which the adjustable element is enclosed in a housing, a flexible sleeve is provided to enclose the housing, said sleeve and housing being filled with liquid, and means are provided to provide fluid communication between the housing and the sleeve to keep the pressure the same in the inside and outside of the housing.

References Cited

UNITED STATES PATENTS

| | | | |
|---|---|---|---|
| 2,664,269 | 12/1953 | Knight | 175—245 X |
| 2,681,567 | 6/1954 | Widess | 175—42 X |
| 2,700,897 | 2/1955 | Arps | 175—42 X |
| 2,791,398 | 5/1957 | O'Reilly | 174—46 X |
| 2,925,251 | 2/1960 | Arps | 175—45 X |

CHARLES E. O'CONNELL, *Primary Examiner.*

NILE C. BYERS, *Examiner.*